(12) United States Patent
Kumar et al.

(10) Patent No.: US 12,182,508 B2
(45) Date of Patent: Dec. 31, 2024

(54) NATURAL LANGUAGE QUESTION ANSWERING USING NON-RELATIONAL TABLES

(71) Applicant: International Business Machines Corporation, Armonk, NY (US)

(72) Inventors: Vishwajeet Kumar, Bangalore (IN); Jaydeep Sen, Bangalore (IN); Samarth Bharadwaj, Bangalore (IN); Saneem Ahmed Chemmengath, Bangalore (IN); Ioannis Katsis, San Jose, CA (US); Mustafa Canim, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 434 days.

(21) Appl. No.: 17/656,487

(22) Filed: Mar. 25, 2022

(65) Prior Publication Data

US 2023/0306199 A1    Sep. 28, 2023

(51) Int. Cl.
*G06F 40/279* (2020.01)
*G06F 16/332* (2019.01)
*G06F 40/258* (2020.01)

(52) U.S. Cl.
CPC ........ *G06F 40/279* (2020.01); *G06F 16/3329* (2019.01); *G06F 40/258* (2020.01)

(58) Field of Classification Search
CPC ... G06F 40/279; G06F 16/3329; G06F 40/258
See application file for complete search history.

(56) References Cited

U.S. PATENT DOCUMENTS

| | | | |
|---|---|---|---|
| 2020/0104414 A1 | 4/2020 | Filoti | |
| 2021/0158176 A1* | 5/2021 | Wan | G06F 18/22 |
| 2022/0044011 A1* | 2/2022 | Shanmugasundaram | G06F 40/216 |
| 2022/0044134 A1* | 2/2022 | Joy | G06N 3/045 |
| 2023/0196813 A1* | 6/2023 | Muthu | G06V 30/414 382/190 |

OTHER PUBLICATIONS

Bagwe et al., "Automatic Numerical Question Answering on Table using BERT-GNN", 978-1-7281-9656-5/20, © 2020 IEEE, 7 pages.
Blank et al., "Querying NoSQL with Deep Learning to Answer Natural Language Questions", Conference Paper in Proceedings of the AAAI Conference on Artificial Intelligence—Jan. 2019, 7 pages.

(Continued)

*Primary Examiner* — Sonia L Gay
(74) *Attorney, Agent, or Firm* — Stosch Sabo

(57) ABSTRACT

A question answering bot that digests non-relational data tables is provided. A processor receives a question regarding a non-relational data table. A processor extracts at least one feature of the question using a natural language processing (NLP) model. A processor extracts at least one similar feature of the non-relational data table to the extracted at least one feature of the question. A processor determines at least one relevant cell in the non-relational data table based on the at least one feature of the question and the at least one similar feature of the non-relational data table. A processor provides an answer to the question, where the answer is based on the at least one relevant cell.

20 Claims, 3 Drawing Sheets

(56) References Cited

OTHER PUBLICATIONS

Chen et al., "Open Question Answering Over Tables and Text", Published as a conference paper at ICLR 2021, 18 pages.
Talmor et al., "Multimodalqa: Complex Question Answering Over Text, Tables and Images", Published as a conference paper at ICLR 2021, 12 pages.
Trivedi et al., "LC-QuAD: A Corpus for Complex Question Answering over Knowledge Graphs", Bonn, Germany, accessed on Feb. 8, 2022, 8 pages, <https://jens-lehmann.org/files/2017/iswc_lcquad.pdf>.
Zhang, Xuanyu, "CFGNN: Cross Flow Graph Neural Networks for Question Answering on Complex Tables", The Thirty-Fourth AAAI Conference on Artificial Intelligence (AAAI-20), Copyright © 2020, 8 pages.

\* cited by examiner

NATURAL LANGUAGE QUESTION ANSWERING USING NON-RELATIONAL TABLES

BACKGROUND OF THE INVENTION

The present invention relates generally to the field of database question answering, and more particularly to querying non-relational tables for answers.

Database question answering is the process of querying a database while using a natural language question, such as "what is the average age of participants?". A question answering program or module will perform natural language processing (NLP) to the question and identify the data points in the database needed to provide an answer and then calculate and return the result. Databases for question answering were previously structured, such as using search query language (SQL). However, many data sources exist in non-relational format, such as non-relational SQL or NoSQL. For example, a table in an old book is non-relational, while still being in tabular form.

SUMMARY

Embodiments of the present invention provide a method, system, and program product to provide a question answering bot that digests non-relational data tables. A processor receives a question regarding a non-relational data table. A processor extracts at least one feature of the question using a natural language processing (NLP) model. A processor extracts at least one similar feature of the non-relational data table to the extracted at least one feature of the question. A processor determines at least one relevant cell in the non-relational data table based on the at least one feature of the question and the at least one similar feature of the non-relational data table. A processor provides an answer to the question, where the answer is based on the at least one relevant cell.

DETAILED DESCRIPTION

Figure 1:
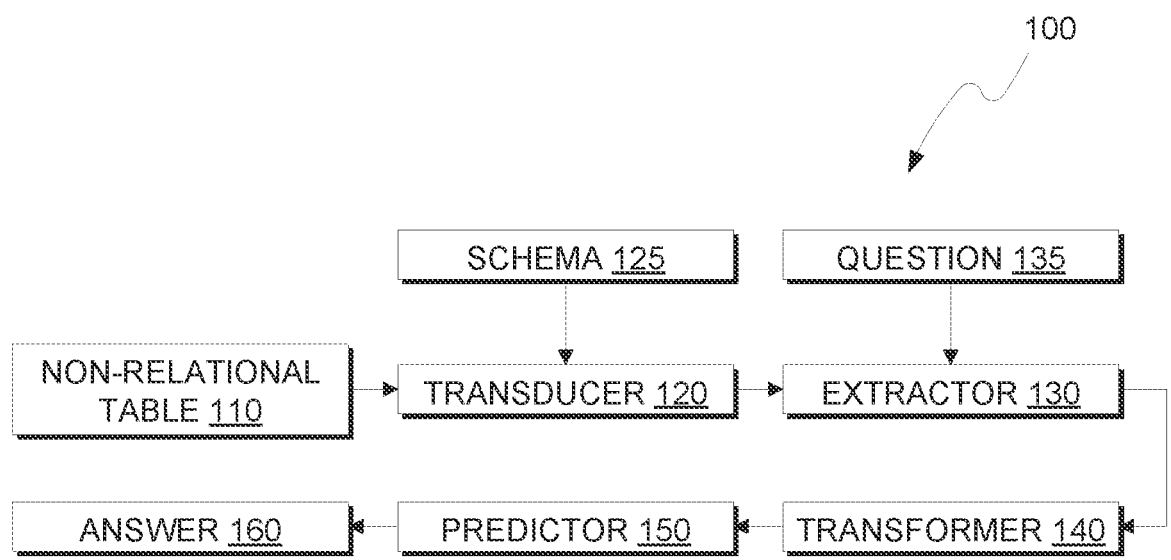
FIG. 1 is a functional block diagram illustrating a question/answering environment, in accordance with an exemplary embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiment of the present invention recognize that by providing question answering of non-relational table data, improvements to that data availability to a question and answering bot can be achieved. Previous question answering bots, or QA bots, required structured data tables when digesting the table's data and responding to questions. However, non-relational tables have existed well before the existence of computers and are still created to this day, with non-relational tables not having any indicators or the like to denote structure in the table (e.g., non-relational tables are unstructured). As such, these non-relational table corpora have been ignored mostly by modern QA bots. Embodiment of the present invention provide methods and systems to digest and incorporate non-relational tables into the question and answering process.

FIG. 1 depicts a system architecture of a question answering system, generally designated 100, in accordance with an embodiment of the present invention. Initially, non-relational table 110 is provided. As discussed herein, a non-relational table is any table that is not formatted in a relational database representation structure, such as search query language (SQL). Relational tables in database design impose strict structure requirements for each row and column, requiring a rigid schema to be defined and adhered to for all values in the database. Non-relational tables, however, have few requirements in structure other than being tabular (e.g., a row/column format). The content, format and other rules for representation are not defined. For example, a balance sheet in a corporate filing is a non-relational table, as the formatting may change (e.g., one column in the millions, while another is in the billions). Embodiments of the present invention provide methods and systems to digest such tables without manually being converted to a structured representation, such as SQL.

In some scenarios, prior to selecting non-relational table 110, question answering system 100 retrieves one or more non-relational tables based on a domain of the question 135. Question 135 is a natural language query provided by a user. Based on features extracted from the question, question answering system 100 identifies a domain or target table for non-relational table 110. In other scenarios, a user provides non-relational table 110 to question answering system 100 for analysis.

In various embodiments, transducer 120 converts non-relational table 110 based on schema 125. Transducer 120 inserts one or more predicates into the non-relational table 110. Schema 125 defines different logical arrangements non-relational table 110 may have. For example, some non-relational tables may have multiple rows in different hierarchies. For each top level header for the row, transducer 120 inserts a predicate to represent the structure, with an "is_main_row_header" is inserted and an "is_sub_row_header" being inserted for lower hierarchical rows. In this example, transducer 120 applies machine vision to an image of non-relational table 110 and determines any indentation or offset of headers for rows and columns. Based on the domain, transducer 120 determines the main and sub headers for each row and column, and then assigning main and sub heading predicates to non-relational table 110. Schema 125 includes many predicates to represent the structure of non-relational table 110 including, but not limited to, cell hierarchy, links to other cells, no headers, mathematical operator presence, and the like.

In various embodiments, transducer 120 generates schema 125 based on the predicates inserted into non-relational table 110. For example, transducer 120 generates one or more scripts to embed into schema 125. The scripts provide transducer 120 with instructions and of how to digest and convert other non-relational tables that are a similar type of table as non-relational table 110. For example, transducer 120 generates schema 125 for digesting financial tables presented in annual reports of companies. Transducer 120 generates schema 125 for tables of this type that defines physical layout and positional arrangements of this particular type of table (i.e., the locations of row and column headers, subheaders, cells and other parts of the non-relational table). As such, transducer 120 can retrieve schema 125 for similar types of tables to aid in the conversion process of non-relational table 110.

In various embodiments, extractor 130 generates a knowledge graph of the natural language question 135 provided by a user. The knowledge graph is a graph-based representation of the words and phrases contained in question 135. Based on the specific entities of the knowledge graph, extractor 130 also extracts relevant portions of non-relational table 110 that are present in question 135. For example, if natural language question 135 has a subject or predicate in regard to revenue on an income statement, then extractor 130 extracts the relevant portions of non-relational table 110 which indicate revenue. In various embodiments, extractor 130 generates a knowledge sub-graph of non-relational table 110 with the relevant and extracted features pertaining to question 135.

In various embodiments, transformer 140 determines topics and relationships between row and column headers and extracts features regarding non-relational table 110 derived from extractor 130. For example, transformer 140 is a Bidirectional Encoder Representations from Transformers, or BERT model, to determine the topics discussed in the row headers, column headers, footnotes and other information represented as natural language in non-relational table 110. A BERT transformer model digests text from a document (i.e., non-relational table 110) and generates word embeddings or phrase embeddings representing the topics or concepts discussed in the text. Based on the generated embeddings from the transformer model, transformer 140 extracts topics from each part of the non-relational table 110. One of ordinary skill in the art will appreciate that any natural language processing (NLP) model can be used to extract topics and contents of non-relational table 110 without deviating from the invention.

Once the relevant features are extracted and identified by transformer 140, predictor 150 determines answer 160 to question 135 based on an extracted feature graph of non-relational table 110. Predictor 150 includes a reasoning engine based on resource description framework (RDF) graph design to represent the extracted feature graph of non-relational table 110. RDF is a standard model for data interchange on the Web. RDF has features that facilitate data merging even if the underlying schemas differ, and it specifically supports the evolution of schemas over time without requiring all the data consumers to be changed. RDF extends the linking structure of the Web to use URIs to name the relationship between things as well as the two ends of the link (this is usually referred to as a "triple"). Using this simple model, it allows structured and semi-structured data to be mixed, exposed, and shared across different applications. This linking structure forms a directed, labeled graph, where the edges represent the named link between two resources, represented by the graph nodes. This graph view is the easiest possible mental model for RDF and is often used in easy-to-understand visual explanations.

The reasoning engine then provides the RDF framework to an answering module that identifies cell nodes of non-relational table 110 of the BERT model that match the RDF framework of the question. Predictor 150 collates and calculates any computation that is part of the question (e.g., in response to question 135 stating "What is the average of the last two quarters revenue", predictor 150 identifies the last two cells for revenue and calculates an average. Once all calculations have been determined, predictor 150 generates answer 160, which responds with the relevant calculations present in question 135.

Figure 2:
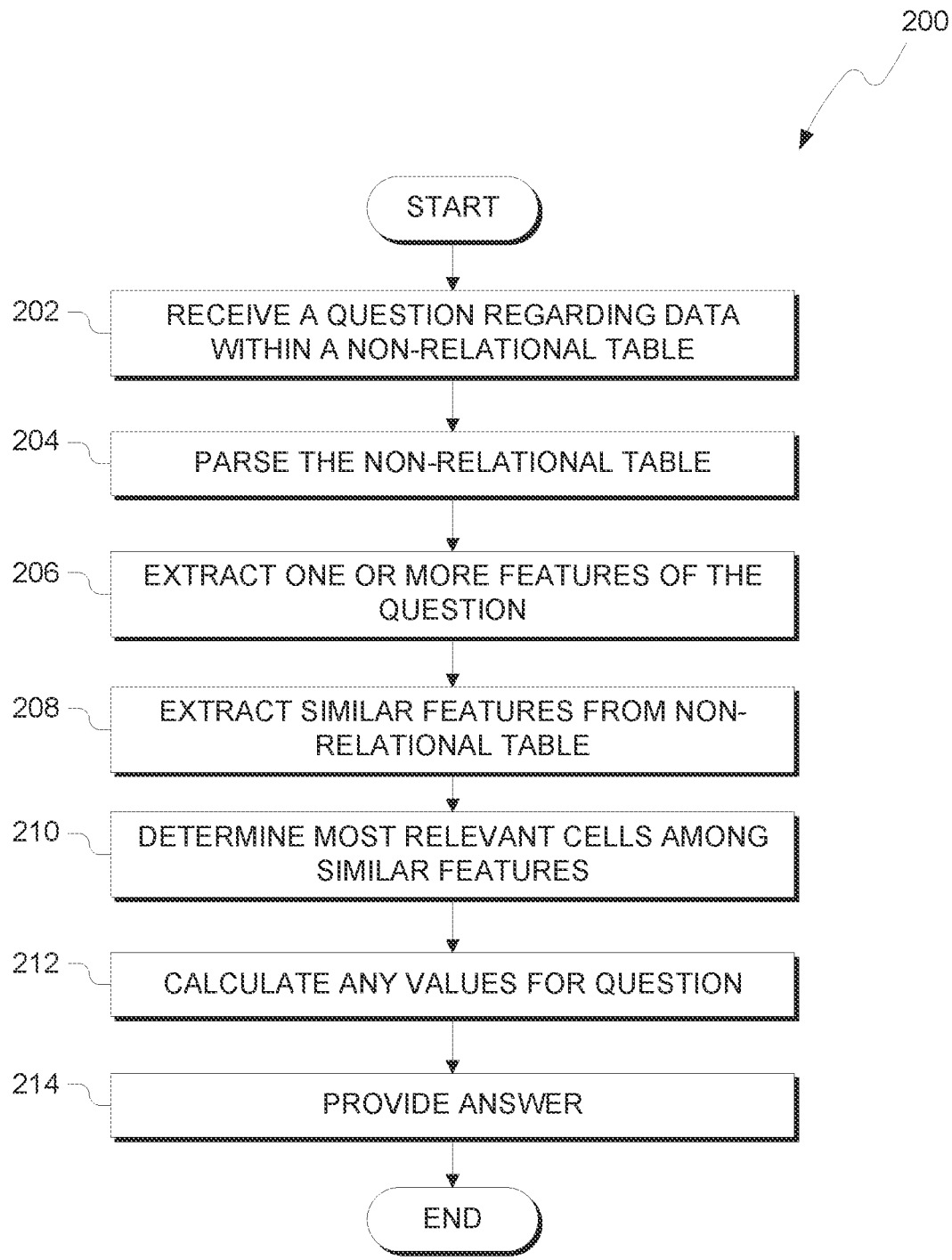
FIG. 2 illustrates operational processes of a question answering system, on a computing device within the environment of FIG. 1, in accordance with an exemplary embodiment of the present invention.

FIG. 2 illustrates operational processes of question answering system 100, on a computing device within the environment of FIG. 1. In process 202, question answering system 100 receives a question regarding data within a non-relational table. In some scenarios, a user provides the non-relational table or otherwise indicates the table as part of the question. In other scenarios, based on the received question and feature extraction of the concepts and subjects of the question, question answering system 100 retrieves the non-relational table based on a search of the extracted features.

In process 204, question answering system 100 parses the non-relation table. transducer 120 converts non-relational table 110 based on schema 125. Transducer 120 inserts one or more predicates into the non-relational table 110. In process 206, question answering system 100 extracts one or more features from the question. For example, a BERT NLP model is used for feature extraction. In process 208, question answering system 100 identifies portions of the non-relational table 110 that are similar to the features extracted from the question in process 206.

In process 210, non-relational table 110 determines which cells in the non-relational table are most relevant to the question. For example, if the question regards a range such as period of time or other division of the table, then question answering system 100 retrieves the cells and data values relevant to the question. In process 212, question answering system 100 performs any calculations pertinent to the question. For example, if the question asks for an average or other statistical measure, then question answering system 100 after retrieving the relevant cells, calculates the requested result. In process 214, question answering system 100 generates a natural language response containing the calculations determined in process 212.

Figure 3:
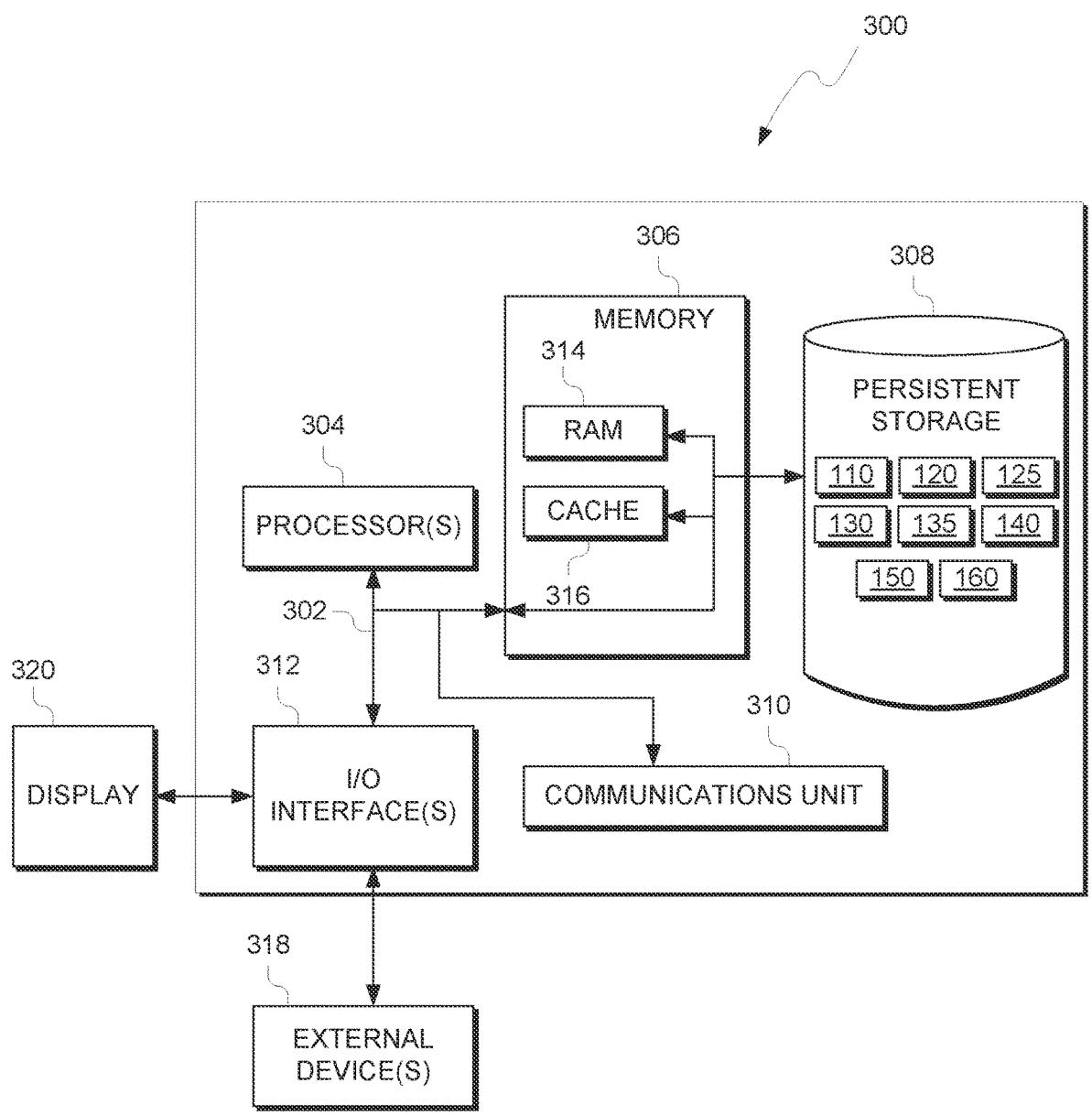
FIG. 3 depicts a block diagram of components of the computing device executing a question answering system, in accordance with an exemplary embodiment of the present invention.

FIG. 3 depicts a block diagram, 300, of components of a question answering system 100, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Question answering system 100 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Non-relational table 110, transducer 120, schema 125, extractor 130, question 135, transformer 140, predictor 150 and answer 160 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network. In these examples, communications unit 310 includes one or more network interface cards. Communications unit 310 may provide communications through the use of either or both physical and wireless communications links. Non-relational table 110, transducer 120, schema 125, extractor 130, question 135, transformer 140, predictor 150 and answer 160 may be downloaded to persistent storage 308 through communications unit 310.

I/O interface(s) 312 allows for input and output of data with other devices that may be connected to question answering system 100. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., non-relational table 110, transducer 120, schema 125, extractor 130, question 135, transformer 140, predictor 150 and answer 160, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
    receiving, by one or more processors, a question regarding a non-relational data table;
    generating, by the one or more processors, a schema based on a physical layout of the non-relational data table, wherein the schema includes one or more predicates that indicate the physical layout of the non-relational data table;
    extracting, by the one or more processors, at least one feature of the question using a natural language processing (NLP) model;
    extracting, by the one or more processors, at least one similar feature of the non-relational data table to the extracted at least one feature of the question;
    determining, by the one or more processors, at least one relevant cell in the non-relational data table based on the at least one feature of the question and the at least one similar feature of the non-relational data table; and
    providing, by the one or more processors, an answer to the question, wherein the answer is based on the at least one relevant cell.

2. The method of claim 1, the method further comprising:
    identifying, by the one or more processors, a similar non-relational data table to the non-relational data table; and
    extracting, by the one or more processors, a feature from the similar non-relational data table based on the schema generated based on the non-relational data table.

3. The method of claim 1, wherein the physical layout of the non-relational data table includes position information of one or more selected from a group consisting of: row and column headers, row and column subheaders, and cells.

4. The method of claim 1, wherein the non-relational data table includes unstructured data.

5. The method of claim 1, wherein the NLP model is a Bidirectional Encoder Representations from Transformers (BERT) model.

6. A computer program product comprising:
    one or more computer-readable storage media and program instructions stored on the one or more computer-readable storage media, the program instructions comprising:
        program instructions to receive a question regarding a non-relational data table;
        program instructions to generate a schema based on a physical layout of the non-relational data table, wherein the schema includes one or more predicates that indicate the physical layout of the non-relational data table;
        program instructions to extract at least one feature of the question using a natural language processing (NLP) model;
        program instructions to extract at least one similar feature of the non-relational data table to the extracted at least one feature of the question;
        program instructions to determine at least one relevant cell in the non-relational data table based on the at least one feature of the question and the at least one similar feature of the non-relational data table; and
        program instructions to provide an answer to the question, wherein the answer is based on the at least one relevant cell.

7. The computer program product of claim 6, the one or more computer-readable storage media further storing:
    program instructions to identify a similar non-relational data table to the non-relational data table; and
    program instructions to extract a feature from the similar non-relational data table based on the schema generated based on the non-relational data table.

8. The computer program product of claim 6, wherein the physical layout of the non-relational data table includes position information of one or more selected from a group consisting of: row and column headers, row and column subheaders, and cells.

9. The computer program product of claim 6, wherein the non-relational data table includes unstructured data.

10. The computer program product of claim 6, wherein the NLP model is a Bidirectional Encoder Representations from Transformers (BERT) model.

11. A computer system comprising:
    one or more computer processors;
    one or more computer readable storage media; and
    program instructions stored on the computer readable storage media for execution by at least one of the one or more processors, the program instructions comprising:

program instructions to receive a question regarding a non-relational data table;

program instructions to generate a schema based on a physical layout of the non-relational data table, wherein the schema includes one or more predicates that indicate the physical layout of the non-relational data table;

program instructions to extract at least one feature of the question using a natural language processing (NLP) model;

program instructions to extract at least one similar feature of the non-relational data table to the extracted at least one feature of the question;

program instructions to determine at least one relevant cell in the non-relational data table based on the at least one feature of the question and the at least one similar feature of the non-relational data table; and program instructions to provide an answer to the question, wherein the answer is based on the at least one relevant cell.

12. The computer system of claim 11, the one or more computer readable storage media further storing:

program instructions to identify a similar non-relational data table to the non-relational data table; and program instructions to extract a feature from the similar non-relational data table based on the schema generated based on the non-relational data table.

13. The computer system of claim 11, wherein the physical layout of the non-relational data table includes position information of one or more selected from a group consisting of: row and column headers, row and column subheaders, and cells.

14. The computer system of claim 11, wherein the non-relational data table includes unstructured data.

15. The method of claim 1, wherein the one or more predicates comprise a main heading predicate and a sub heading predicate.

16. The method of claim 1, wherein the one or more predicates comprise a predicate representing cell hierarchy.

17. The method of claim 1, wherein the one or more predicates comprise a predicate representing a link to another cell.

18. The method of claim 1, wherein the one or more predicates comprise a predicate representing no header.

19. The method of claim 1, wherein the one or more predicates comprise a predicate representing a presence of a mathematical operator.

20. The method of claim 1, wherein the one or more predicates are determined based on machine vision applied to an image of the non-relational data table.

* * * * *